(12) United States Patent
Lau et al.

(10) Patent No.: US 7,254,003 B2
(45) Date of Patent: Aug. 7, 2007

(54) DIFFERENTIAL NULLING AVALANCHE (DNA) CLAMP CIRCUIT AND METHOD OF USE

(75) Inventors: Ngai Ming Lau, Fountain Hills, AZ (US); Jeffrey D. Gengler, Maricopa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 257 days.

(21) Appl. No.: 11/089,751

(22) Filed: Mar. 24, 2005

(65) Prior Publication Data

US 2006/0215340 A1    Sep. 28, 2006

(51) Int. Cl.
H02H 9/00 (2006.01)
H02H 9/08 (2006.01)
H02H 3/22 (2006.01)
H02H 3/20 (2006.01)

(52) U.S. Cl. .................. 361/91.1; 361/56; 361/93.9; 361/111

(58) Field of Classification Search .................. 361/54, 361/56, 93.9, 111; 363/124, 163
See application file for complete search history.

(56) References Cited

U.S. PATENT DOCUMENTS

| | | | |
|---|---|---|---|
| 3,937,988 A * | 2/1976 | DeClue et al. | 327/321 |
| 4,310,867 A * | 1/1982 | Shreve et al. | 361/90 |
| 4,644,288 A * | 2/1987 | Stanley | 330/2 |
| 5,115,464 A * | 5/1992 | Waldman | 379/72 |
| 5,452,171 A * | 9/1995 | Metz et al. | 361/56 |
| 5,594,611 A * | 1/1997 | Consiglio et al. | 361/118 |
| 5,909,367 A * | 6/1999 | Change | 363/163 |
| 6,028,878 A * | 2/2000 | Agarwal et al. | 372/50.12 |
| 6,140,859 A * | 10/2000 | Regier | 327/478 |
| 6,275,088 B1 * | 8/2001 | Jain | 327/312 |
| 6,448,841 B1 * | 9/2002 | Milazzo | 327/536 |
| 6,690,594 B2 * | 2/2004 | Amarillas et al. | 363/124 |
| 6,754,476 B1 * | 6/2004 | Reinhardt | 455/127.1 |
| 6,777,996 B2 * | 8/2004 | Smith, Jr. | 327/309 |
| 6,847,511 B2 * | 1/2005 | Ohnakado et al. | 361/56 |
| 6,894,881 B1 * | 5/2005 | Vashchenko et al. | 361/56 |
| 6,999,292 B2 * | 2/2006 | Clara et al. | 361/91.1 |
| 7,005,708 B2 * | 2/2006 | Mergens et al. | 257/360 |
| 7,072,161 B2 * | 7/2006 | Chen | 361/91.1 |

(Continued)

*Primary Examiner*—Robert L. Deberadinis
*Assistant Examiner*—Tien Mai
(74) *Attorney, Agent, or Firm*—Ingrassia Fisher & Lorenz

(57) ABSTRACT

A circuit for protecting an electronic device including a differential nulling avalanche clamp circuit (200, 300) and method of using the circuit in an electronic system (100) to limit radio frequency overdrive. The electronic system (100) includes a surge clamp (130) coupled to dissipate an electrical surge effect of a first frequency from a noise sensitive node (140) and a ring wave clamp (120) coupled to dissipate an electrical surge effect of a second frequency from the noise sensitive node (140). The ring wave clamp circuit (200, 300) includes a first bipolar junction transistor (210, 310), a second bipolar junction transistor (220, 320) coupled to the first bipolar junction transistor (210, 310), and a resistive circuit (230, 330, 340) coupled to the first and second bipolar junction transistors (210, 220, 310, 320). A method of using the electronic system (100) in a device to limit radio frequency overdrive includes the steps of driving an output node with the radio frequency signal subject to overdrive effects (410), clamping a first order overdrive effect on a first node using a first clamp circuit (420), and clamping a second order overdrive effect on the first node using the differential nulling avalanche clamp circuit (430).

20 Claims, 2 Drawing Sheets

U.S. PATENT DOCUMENTS

2002/0181180 A1* 12/2002 Ivanov et al. ............... 361/93.9
2003/0214767 A1* 11/2003 Singh et al. .................. 361/56
2003/0231444 A1* 12/2003 Kitahara et al. ............... 361/54
2004/0061565 A1* 4/2004 Austin et al. ........... 331/177 V

* cited by examiner

DIFFERENTIAL NULLING AVALANCHE (DNA) CLAMP CIRCUIT AND METHOD OF USE

TECHNICAL FIELD OF THE INVENTION

The present invention relates to circuitry, and more particularly, to protecting circuitry from potentially harmful voltage surges.

BACKGROUND OF THE INVENTION

Many types of electronic devices must be protected from-high voltage surges. For example, cable television (CATV) amplifiers must withstand surges induced by nearby lightning strikes. Such devices can use crowbar devices such as gas discharge tubes and semiconductor devices which are intended to limit surge voltages and dissipate surge currents. Typical voltage surge protection methods often do not provide a fast enough voltage clamping action to prevent the damages of the protected device, and often cause non-linear affects which degrade the distortion performance of the device being protected. Moreover, protection devices typically have a relatively fast turn-on time once their threshold voltage is reached, thereby causing a very fast change in voltage (dv/dt). This in turn can induce several cycles of high voltage ringing within the pass band of the diplex filter, and the surge-induced ringing wave can propagate to the output of the device. Typical crowbar devices such as gas discharge tubes can generate potentially damaging ringing voltage cycles when they fire during a surge event. Asymmetric bi-directional characteristics can prevent effective protection against such ring waves.

Accordingly, it is desirable to provide for a surge-ringing wave clamp circuit to protect devices from ring wave stresses. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION OF THE INVENTION

Figure 1:
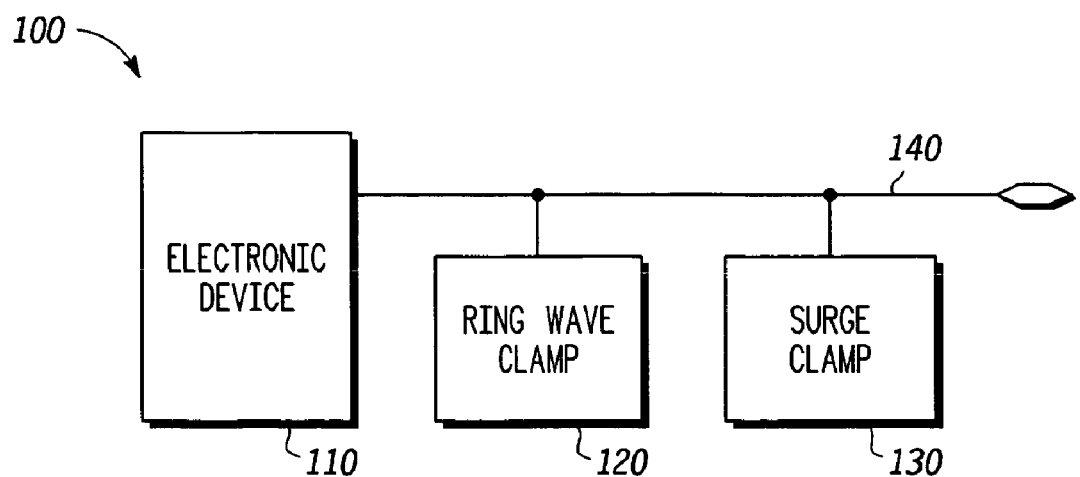
FIG. 1 illustrates an electronic system with clamping protection in accordance with an embodiment of the invention.

The following discussion is intended to provide a detailed description of at least one example of the invention and should not be taken to be limiting of the invention itself. Rather, any number of variations may fall within the scope of the invention which is properly defined in the claims following this description. A differential nulling avalanche (DNA) clamp circuit, in the form of a high voltage radio frequency (RF) ring wave clamp circuit, is disclosed to provide protection of sensitive devices without substantially altering distortion performance of the protected device. FIG. 1 illustrates an electronic system 100, comprising an electronic device 1 10, such as a compound semiconductor amplifier, a ring wave clamp 120, and a surge clamp 130. Electronic device 1 10 is representative of a device that is sensitive to or otherwise would benefit from surge voltage protection, such as a radio frequency amplifier. Electronic device 110 has a terminal, or output node, coupled to an input/output of a noise sensitive node 140. Surge clamp 130 is coupled to node 140 to clamp the amplitude of any voltage surge on node 140. Ring wave clamp 120 is coupled to node 140 to clamp a voltage ring wave within or superposed upon the surge on node 140. Ring wave clamp 120 selectively limits RF signals. Normal signals are unimpeded and overdrive signals are clamped whether they are flowing into or out of electronic device 110. In one embodiment, clamps 120 and 130 are coupled between the output node of the electronic device and ground.

Surge clamp 130 is a crowbar device that discharges a surge voltage and conducts surge current of a first frequency off of node 140 to protect electronic device 110. In one embodiment, surge clamp 130 is a gas discharge tube that dissipates up to a 6 kV surge wave. Surge clamp 130 has a fast switching time to dissipate the surge as soon as is practical or possible for system 100.

Although the surge wave is largely clamped by surge clamp 130, surge clamp 130 can cause a ring wave to be generated on node 140 as a by-product of the fast discharge time of surge clamp 130. Ring wave clamp 120 discharges a surge voltage and conducts surge current of a second frequency off node 140 to protect electronic device 110. It should be understood that the electrical surge effect of the second frequency discharged by ring wave clamp 130 is higher than the electrical surge effect of the first frequency discharged by surge clamp 130. The ring wave may include a number of voltage peaks that may damage electronic device 110 or may degrade the performance of electronic device 110. For example, the ring wave cycles may have an amplitude of up to 200V and a frequency of 50 to 150 MHz during the aforementioned exemplary 6 kV surge event.

Ring wave clamp 120 is coupled to node 140 to reduce voltage magnitudes of ringing waves at RF frequencies that are generated from crowbar devices used to protect equipment from surges induced by, for example, nearby lighting strikes. Ring wave clamp 120 is designed to allow RF signals to pass while rejecting higher voltage unwanted signals. Ring wave clamp 120 reduces the voltage magnitude to a level that does not harm sensitive active device modules.

Ring wave clamp 120 can be implemented internally or externally to a device to be protected. The illustrated embodiment shows ring wave clamp 120 placed close to electronic device 110 to increase the effectiveness of the protection afforded by ring wave clamp. 120. Ring wave clamp 120 serves as a differential nulling avalanche clamp circuit that provides for rapid conduction of currents from node 140 without allowing higher voltages to be established on node 140 in a bi-directional way, thereby protecting against bi-directional waves such as ring waves. Ring wave clamp 120 is also designed to turn on only during excessively high voltages while allowing normal operational high voltage peaks to propagate out of electronic device 110 substantively undistorted.

Figures 2, 3:
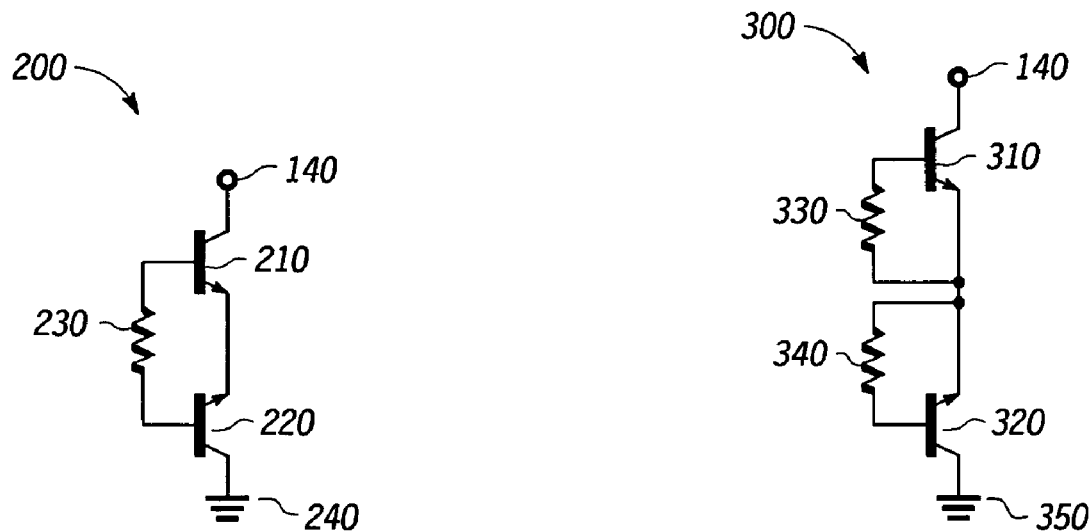
FIG. 2 illustrates a first embodiment of a ring wave clamp circuit according to the present invention.
FIG. 3 illustrates another embodiment of a ring wave clamp circuit according to the present invention.

FIG. 2 illustrates in schematic form one embodiment of ring wave clamp 120 (FIG. 1) and more particularly, a ring wave clamp circuit according to the present invention. FIG. 2 illustrates a ring wave clamp circuit 200 including a first bipolar junction transistor 210 and a second bipolar junction transistor 220, and a resistor 230. Bipolar junction transistor 210 is an NPN junction transistor, and bipolar junction transistor 220 is an NPN junction transistor. The preferred method of application uses two devices of the same type for transistor 210 and transistor 220 since polarity of the surge wave can be of both positive and negative magnitude. Bipolar junction transistors 210 and 220 are arranged in a differential nulling configuration to minimize distortion impact to the device being protected from surge voltages. Bipolar junction transistor 210, bipolar junction transistor 220 and resistor 230 can be formed within an integrated circuit, a hybrid module, or a radio frequency transmitter depending upon device specifications.

Bipolar junction transistor 210 includes a collector or a first current handling electrode, a base or a control electrode, and an emitter or second current handling electrode. More specifically, transistor 210 includes a collector coupled to noise sensitive node 140, a base coupled to a first terminal of resistor 230, and an emitter coupled to an emitter of transistor 220. Bipolar junction transistor 220 includes a base or control electrode coupled to a second terminal of resistor 230, an emitter or second current handling electrode coupled to the emitter of transistor 210, and a collector or first current handling electrode coupled to a power reference node 240, or reference voltage, such as ground. Transistors 210 and 220 are commercially available, radio frequency (RF) bipolar transistors coupled to provide a differential nullifying bi-directional clamp utilizing the collector-emitter junction to achieve fast clamping action. Resistor 230 is a simple example of a resistive circuit or network that ties the bases of transistor 210 and transistor 220 together to create a nulling effect that eliminates the non-linear effects inherent to the transistors. Other embodiments use other types of resistors. Typically, resistor 230 is chosen having a small resistance value. The smaller the resistance value the better nulling will be achieved, resulting in less impact to distortion. In a preferred embodiment, the resistor would have a resistance value of less than two ohms. In this particular embodiment, resistor 230 has a resistance value of zero ohms.

The collector-to-emitter breakdown voltage ($V_{(BR)CEO}$) of each of transistors 210 and 220 has a high enough breakdown voltage to avoid impacting distortion performance of desired signals output from device 110. If this parameter is too low, the high output voltage peaks can become clipped, causing degradation in distortion performance. The $V_{(BR)CEO}$ is preferably selected above the peak output voltage but with the lowest breakdown voltage possible without affecting distortion performance. This $V_{(BR)CEO}$ selection allows ring wave clamp transistors 210 and 220 to break down as fast as possible to damp ringing waves. Some buffer voltages may be chosen to prevent device-to-device variation from causing the clamp to react prematurely. In one embodiment, transistors 210 and 220 have a device $V_{(BR)CEO}$ within 12-17 V. Typically, the higher the transition frequency the less time it takes the device to react. In this embodiment, transistors 210 and 220 have a transition frequency with a minimum of 5 GHz to ensure sufficient reaction speed to incoming surge-ringing waves.

The current handling capability of ring wave clamp 120 is also important for proper clamp selection. In one embodiment, each bipolar transistor 210 and 220 can handle at least a minimum of 50 mA so that a maximum collector current of each transistor exceeds 50 mA. Selecting a device with a lower maximum current rating can cause problems during a surge-ringing wave event including potential destruction of transistors 210 and 220. Destruction of transistors 210 and 220 results in the failure of transistors 210 and 220 to sink sufficient current to protect electronic device 110 (FIG. 1). The highest possible current sinking during breakdown is desirable because it further reduces the peak voltage magnitude of the ringing waves. A larger device would allow for higher current sinking during conduction, but results in a higher parasitic capacitance in the off state, thereby potentially affecting the gain response of electronic device 110 (FIG. 1). Selecting devices close to the minimum current will present more manageable, possibly even negligible, parasitic capacitance.

FIG. 3 illustrates another embodiment of ring wave clamp 120 (FIG. 1) and more particularly a ring wave clamp circuit according to the present invention. Ring wave clamp circuit 300 includes bipolar junction transistors 310 and 320, a first resistor 330 and a second resistor 340. A resistive circuit or network is provided by first resistor 330 and second resistor 340. Transistors 310 and 320 are commercially available, radio frequency (RF) bipolar transistors coupled to provide a differential nullifying bi-directional clamp utilizing the collector-emitter junction to achieve fast clamping action. The resistive network, and more particularly resistors 330 and 340, are coupled to the bases and emitters of transistors 310 and 320. Transistor 310 includes a collector coupled to noise sensitive node 140, a base coupled to a first terminal of first resistor 330, and an emitter coupled to an emitter of transistor 320. Bipolar junction transistor 320 includes a base coupled to a first terminal of resistor 340, an emitter coupled to the emitter of transistor 310, and a collector coupled to a power reference node 350, such as ground. First resistor 330 includes a first terminal coupled to the base of transistor 310 and a second terminal coupled to the emitter of transistor 310, and second resistor 340 includes a first terminal coupled to the base of transistor 320 and a second terminal coupled to the emitter of transistor 320. Since the emitters of transistors 310 and 320 are coupled, the second terminals of resistors 330 and 340 are also coupled. In this embodiment, the second terminals of resistors 330 and 340 are directly coupled. First resistor 330 and second resistor 340 provide an example of a resistive circuit or network for altering current response with applied voltage of the base-emitter junction thereby changing the collector emitter junction current response of ring wave clamp 120.

Resistor 330 and resistor 340 have equivalent resistance values so that the reaction of clamp 120 (FIG. 1) is the same when either a negative or positive ring wave is applied. Ring waves have both polarities but they are usually damped over time so the first peak has the largest magnitude. The chosen resistance value for resistors 330 and 340 depend on how the user wishes to alter the current response. By placing resistors 330 and 340 in this configuration, the current through the base-emitter junction is reduced. This in turn alters the collector emitter current versus applied voltage (applied voltage being the ring wave). Small value resistors will reduce the effect of the base-emitter junction by allowing the current to bypass the base-emitter junction and thus utilize the collector-base junction only. Larger value resistors will have the same effect but to a lesser degree. Thus, resistors 330 and 340 alter the breakdown voltage of the collector emitter. The value of resistors 330 and 340 can to be tailored to the application. The user can determine the balance between device activation and minimum breakdown that will not effect distortion. In this particular embodiment, resistor 330 has a first resistance value of less than twenty ohms and resistor 340 has an equivalent resistance value of less than twenty ohms. The smaller the resistance values the better nulling will be achieved, resulting in less impact to distortion.

Figure 4:
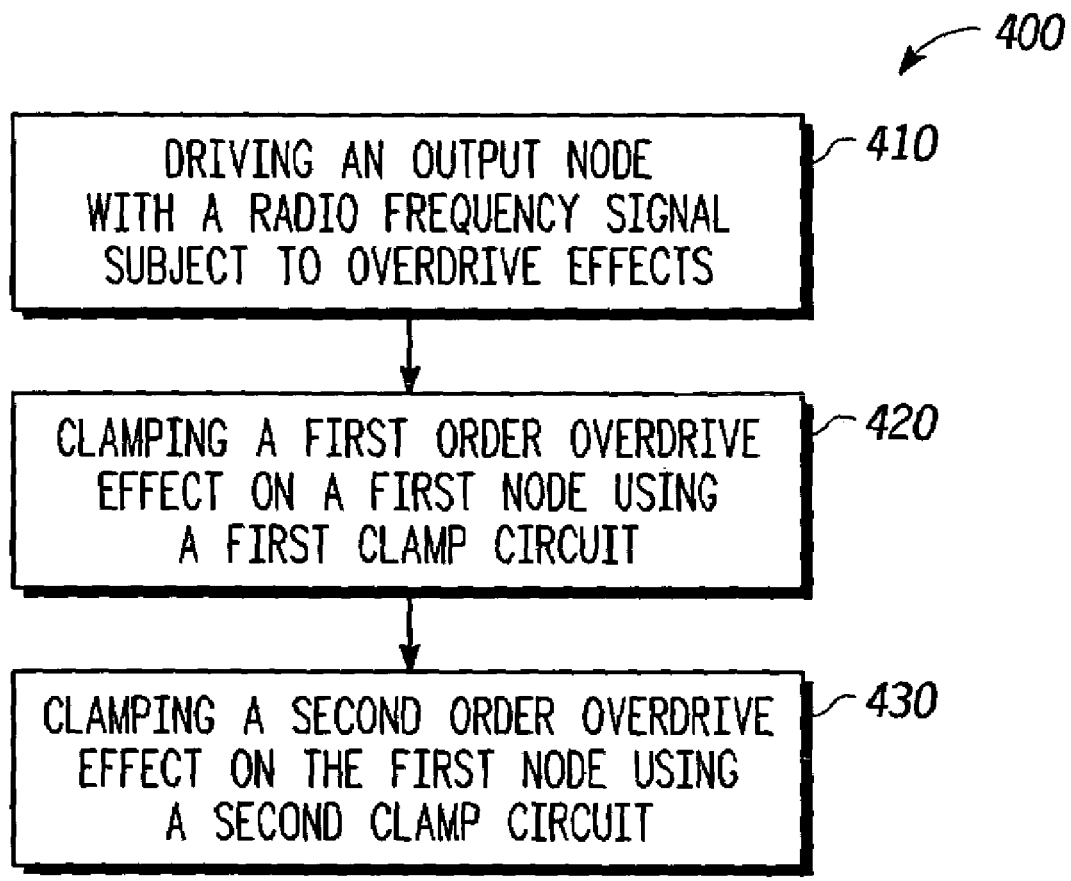
FIG. 4 illustrates in a flow diagram a method of limiting the frequency overdrive of an amplifier using the ring wave clamp circuit of the present invention.

Turning now to FIG. 4, illustrated in a flow diagram is a method 400 for limiting radio frequency overdrive of a radio frequency amplifier. The method 400 includes the use of the differential nulling avalanche clamp circuit, and more particularly a ring wave clamp circuit, described in FIGS. 2 and 3. Method 400 includes a first step of driving an output node with a radio frequency signal that is subject to overdrive effects (410). The next step (420) provides for clamping a first order overdrive effect on a first node using a first clamp circuit, such as surge clamp 130 (FIG. 1). The first order overdrive effect comprises an electrical pulse during a first time. The next step (430) provides for clamping a second order overdrive effect on the first node using a second clamp circuit, such as ring wave clamp circuit 200 (FIG. 2), or ring wave clamp circuit 300 (FIG. 3). The second order overdrive effect comprises a wave including a plurality of pulses during the first time. To carry out step 430, an first NPN bipolar junction transistor, a second NPN bipolar junction transistor, and a resistor network are provided. The NPN bipolar junction transistor comprises a collector coupled to the output node. The NPN bipolar junction transistor comprises an emitter coupled to an emitter of the first bipolar junction transistor and having a collector coupled to ground. The resistor network is coupled to each base of the bipolar junction transistors (FIGS. 2 and 3). Method 400 provides for the limiting of the radio frequency overdrive in an amplifier device, but it should be understood that method 400 can be used to provide for surge protection in many types of other devices.

A differential nulling avalanche (DNA) clamp circuit, also known as a ring wave clamp circuit, has been discovered that provides fast radio frequency (RF) clamping action to protect sensitive devices from high voltage surge damages. The circuitry of the present invention uses bipolar $V_{(BR)CEO}$ avalanche characteristics as a fast clamping mechanism to protect the sensitive device from surge voltages. In its simplest circuit configuration, prototypes built with the proposed circuitry idea have demonstrated effective fast voltage clamping action capable of preventing damage to sensitive electronic devices during a transient voltage surge event. During normal device operation, the circuitry does not degrade the RF distortion performance characteristics of the protected device.

Accordingly, provided is a circuit for protecting an electronic device having a noise sensitive node. The circuit is comprised of a surge clamp and a ring wave clamp. The surge clamp is coupled to the noise sensitive node to dissipate an electrical surge effect of a first frequency from the noise sensitive node. The ring wave clamp is coupled to the noise sensitive node to dissipate an electrical surge effect of a second frequency from the noise sensitive node. The second frequency is higher than the first frequency. The ring wave clamp is comprised of a first bipolar junction transistor, a second bipolar junction transistor and a resistive circuit. The first bipolar junction transistor has a collector coupled to the noise sensitive node. The second bipolar junction transistor has an emitter coupled to an emitter of the first bipolar junction transistor and a collector configured to be coupled to a reference voltage. The resistive circuit is coupled to a base of the first bipolar junction transistor and a base of the second bipolar junction transistor. The resistive circuit comprises a resistor having a first terminal coupled to the base of the first bipolar junction transistor and a second terminal coupled to the base of the second bipolar junction transistor. The resistor is selected to have a resistance of less than two ohms. In the alternative, the resistive circuit comprises a first resistor having a first terminal coupled to the base of the first bipolar junction transistor and a second terminal coupled to the emitter of the first bipolar junction transistor; and a second resistor having a first terminal coupled to the base of the second bipolar junction transistor and a second terminal coupled to the emitter of the second bipolar junction transistor. The first resistor has a first value, the second resistor has a second value, and the first value is equal to the second value. The first bipolar junction transistor is an NPN type transistor and the second bipolar junction transistor is an NPN type transistor.

In addition, provided is an apparatus comprising a compound semiconductor amplifier having an output node, a first bipolar junction transistor having a first current handling electrode coupled to the output node arid a control electrode coupled to a resistive circuit, and a second bipolar junction transistor having a first current handling electrode coupled to a power reference node, a second current handling electrode coupled to a second current handling electrode of the first bipolar junction transistor, and a control electrode coupled to the resistive circuit. The resistive circuit comprising a resistor network for biasing the first bipolar junction transistor and the second bipolar junction transistor. The resistor network is coupled to the second current handling electrode of the first bipolar junction transistor and the second current handling electrode of the second bipolar junction transistor. The resistive circuit comprises a single resistor having a resistance of less than two ohms. In the alternative, the resistive circuit comprises a first resistor having a first terminal coupled to the control electrode of the first bipolar junction transistor and a second terminal coupled to the second current handling electrode of the first bipolar junction transistor; and a second resistor having a first terminal coupled to the control electrode of the second bipolar junction transistor and a second terminal coupled to the second current handling electrode of the second bipolar junction transistor. The first resistor has a first value, the second resistor has a second value, wherein the first value is equal to than the second value. The amplifier, the first bipolar junction transistor and the second bipolar transistor can be comprised within an integrated circuit, a hybrid module, or a radio frequency transmitter.

Finally, provided is a method of limiting a radio frequency signal subject to overdrive of a radio frequency amplifier, the method comprising the steps of: driving an output node with the radio frequency signal subject to overdrive; clamping a first order overdrive effect on a first node using a first clamp circuit, the first order overdrive effect comprising an electrical pulse during a first time; and clamping a second order overdrive effect on the first node using a second clamp circuit, the second order overdrive effect comprising a ring wave comprising a plurality of pulses during the first time. The method further comprises the step of providing the second clamp circuit. The step comprising: providing a first NPN bipolar junction transistor comprising a collector coupled to the output node; providing a second NPN bipolar junction transistor comprising an emitter coupled to an emitter of the first bipolar junction transistor and a collector coupled to a reference voltage; and providing a resistive network coupled to a base of the first NPN bipolar junction transistor and a base of the second NPN bipolar junction transistor. The step of providing a resistor network comprises the steps of: providing a first resistor having a first terminal coupled to the base of the first NPN bipolar junction transistor and a second terminal coupled to the emitter of the second NPN bipolar junction transistor; and providing a second resistor having a first terminal coupled to the base of the second NPN bipolar junction transistor and a second terminal coupled to the emitter of the second NPN bipolar junction transistor. The step of providing the first resistor includes the step of providing the first resistor having a first value. The step of providing the second resistor includes the step of providing the second resistor having a second value, wherein the first value is equal to the second value.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A voltage clamp, comprising:
   a first bipolar junction transistor including a first emitter, a first base, and a first collector configured to be coupled to an electronic device;
   a second bipolar junction transistor including a second emitter coupled to said first emitter and forming an internal floating node there between, a second base coupled to said first base, and a second collector configured to be coupled to a reference voltage.

2. The voltage clamp of claim 1, further comprising a resistor coupled between the first base and the second base.

3. The voltage clamp of claim 2, wherein said resistor includes a resistance of less than two ohms.

4. The voltage clamp of claim 1, wherein said first bipolar junction transistor and said second bipolar junction transistor are the same type of bipolar junction transistor.

5. The voltage clamp of claim 4, wherein said first bipolar junction transistor is an NPN type transistor and said second bipolar junction transistor is an NPN type transistor.

6. A voltage clamp, comprising:
   a first node;
   a first bipolar junction transistor including a first emitter coupled to the first node, a first base coupled to the first node, and a first collector configured to be coupled to an external device;
   a second node coupled to the first node; and
   a second bipolar junction transistor including a second emitter coupled to the second node, a second base coupled to the second node, and a second collector configured to be coupled to a reference voltage.

7. The voltage clamp of claim 6, further comprising a first resistor coupled between said first base and said first node.

8. The voltage clamp of claim 7, further comprising a second resistor coupled between said second base and said second node.

9. The voltage clamp of claim 8, wherein one of said first resistor and said second resistor includes a resistance in the range of zero ohms to about 2 ohms.

10. The clamp of claim 8, wherein said first resistor has a first resistance and said second resistor has a second resistance substantially equal to said first resistance.

11. The clamp of claim 10, wherein said first resistance and said second resistance are each less than twenty ohms.

12. The clamp of claim 6 wherein:
    said first bipolar junction transistor is an NPN bipolar junction transistor; and
    said second bipolar junction transistor is an NPN bipolar junction transistor.

13. The clamp of claim 6 wherein said first bipolar junction transistor and said second bipolar transistor are comprised within an integrated circuit.

14. The clamp of claim 6 wherein said first bipolar junction transistor and said second bipolar transistor are comprised within a hybrid module.

15. The clamp of claim 6 wherein said first bipolar junction transistor and said second bipolar transistor are comprised within a radio frequency transmitter.

16. A method for limiting a radio frequency signal subject to overdriving a radio frequency amplifier, the method comprising:
    driving an output node with the radio frequency signal;
    clamping a first order overdrive effect on a node using a first clamp circuit, said first clamp circuit creating a second order overdrive effect in response to clamping the first order overdrive effect; and
    clamping said second order overdrive effect on said node using a second clamp circuit.

17. The method of claim 16 further comprising:
    providing a first NPN bipolar junction transistor comprising a first emitter, a first base, and a first collector coupled to the node; and
    providing a second NPN bipolar junction transistor comprising a second emitter coupled to the first emitter, a second base, and a second collector coupled to a reference voltage.

18. The method claim 17, further comprising coupling said first base to said second base.

19. The method of claim 18, further comprising coupling a resistor having a resistance greater than zero ohms between said first base and said second base.

20. The method claim 17, further comprising:
    providing a first resistor having a first terminal coupled to said first base and a second terminal coupled to said first emitter;
    providing a second resistor having a third terminal coupled to said second base and a fourth terminal coupled to said second emitter.

* * * * *